United States Patent
Safa et al.

(10) Patent No.: US 7,225,252 B2
(45) Date of Patent: May 29, 2007

(54) OBSERVATION DISPLAY METHOD FOR DYNAMICALLY CHANGING ON MONITOR SCREEN OBJECT INFORMATION OBSERVED ON COMPUTER NETWORK AND OBSERVATION DISPLAY SYSTEM USING COMPUTER NETWORK

(75) Inventors: Laurent Safa, Sakai (JP); Noriaki Fujiwara, Yawata (JP)

(73) Assignee: Matsushita Electric Works, Ltd., Oaza-Kadoma-shi, Osaka (JP)

( * ) Notice: Subject to any disclaimer, the term of this patent is extended or adjusted under 35 U.S.C. 154(b) by 686 days.

(21) Appl. No.: 10/188,332

(22) Filed: Jul. 3, 2002

(65) Prior Publication Data
US 2003/0020751 A1 Jan. 30, 2003

(30) Foreign Application Priority Data
Jul. 3, 2001 (JP) .............................. 2001-201895

(51) Int. Cl.
*G06F 15/173* (2006.01)
(52) U.S. Cl. ..................... 709/224; 709/203; 709/219; 702/3
(58) Field of Classification Search ................ 709/217, 709/224, 230, 203, 219; 725/47; 702/3
See application file for complete search history.

(56) References Cited

U.S. PATENT DOCUMENTS

| | | | |
|---|---|---|---|
| 5,848,378 A * | 12/1998 | Shelton et al. ................. | 702/3 |
| 6,112,246 A * | 8/2000 | Horbal et al. ................. | 709/230 |
| 6,714,977 B1 * | 3/2004 | Fowler et al. ............... | 709/224 |
| 6,970,167 B1 * | 11/2005 | Kumamoto et al. ......... | 345/440 |
| 6,985,837 B2 * | 1/2006 | Moon et al. ................. | 345/419 |
| 2001/0003846 A1 * | 6/2001 | Rowe et al. ................... | 725/47 |
| 2001/0051998 A1 * | 12/2001 | Henderson .................... | 709/217 |
| 2002/0091692 A1 * | 7/2002 | Yoshida et al. ................. | 707/9 |
| 2002/0103897 A1 * | 8/2002 | Rezvani et al. .............. | 709/224 |
| 2002/0130899 A1 * | 9/2002 | Ryan et al. .................. | 709/217 |
| 2002/0165953 A1 * | 11/2002 | Diong ......................... | 709/224 |

* cited by examiner

*Primary Examiner*—David Wiley
*Assistant Examiner*—Phuoc H Nguyen
(74) *Attorney, Agent, or Firm*—Bacon & Thomas, PLLC

(57) ABSTRACT

Observation display method for dynamically changing on monitor screen an object symbol or image related to object information to be observed as observation object on a computer network which is specified by a push request and an observation display system using a computer network. In the present method and system, at a communication terminal for monitor, observation display information in which an object symbol or image related to object information to be observed is included is in advance prepared then the object information is specified by transmitting push request to a communication terminal for observation, while at a communication terminal for observation, the object information specified by the push request is observed then an event response notice, a reply about a change in the object information, is transmitted to the communication terminal for monitor every when an event occurs in conjunction with the object information specified by the push request and the object information is changed thereby.

14 Claims, 6 Drawing Sheets

OBSERVATION DISPLAY METHOD FOR DYNAMICALLY CHANGING ON MONITOR SCREEN OBJECT INFORMATION OBSERVED ON COMPUTER NETWORK AND OBSERVATION DISPLAY SYSTEM USING COMPUTER NETWORK

BACKGROUND OF THE INVENTION

1. Field of the Invention

The present invention relates to an observation display method for displaying object information to be observed as an object symbol or image on a network in which the object symbol or image is dynamically changed on an observation display screen in response to change of event information in conjunction with the object information.

2. Description of the Related Art

In recent years, many companies and the like have set up web pages on web servers in order to make information available to specific clients and to the general public as the Internet has come into wide use. Such web pages are constructed using page description language such as HTML and it has become possible to browse such web pages, constructed of a variety of object symbols or images such as text, images and graphics, by means of a web browser installed within a client terminal.

In addition, XML that a user can freely designate tags and dynamic HTML (DHTML) that functions of HTML are expanded so as to allow contents to be dynamically changed, have also been generally utilized as page description languages.

On the other hand, push technology has been developed wherein server information is retrieved by a client terminal without a client's initiated operation, however, such push technology is only generally used as so-called pseudo-push wherein a server does not send information in a one-way manner to a client but the client automatically accesses the server periodically so as to gain information.

The present invention is proposed as a novel user-customized observation display method and system that have been newly developed in view of the above described technical background and that are convenient for users and easy to use.

SUMMARY OF THE INVENTION

Accordingly, the primary object of the present invention is to provide an observation display method and system capable of displaying by using web browser or the like an object symbol or image related to object information to be observed in which the object symbol or image changes depending on occurrence of event information or the change in said object information, and an observation display system for carrying out the method.

In addition, a second object of the present invention is to provide an observation display method that can be utilized for observation without recognition of a user about the communication protocols to the respective servers even in the case that a plurality of display items, of which the information resources differ from each other, are displayed for observation.

These and other objects, features and advantages of the invention will become more apparent upon a reading of the following detailed specification and drawings.

An observation display method according to the present invention has been proposed in order to achieve the above-described objects, in which the present method is carried out by using computer network in which a communication terminal for monitor which has an observation monitor screen and a communication terminal for observation which constantly observes information object to be observed are provided.

That is to say, two communication terminal units for carrying out this method is characterized in that the communication terminal for monitor is provided with a function of preparing observation display information for displaying an object symbol or image related to the object information to be observed, i.e. an observation object, and accesses the communication terminal for observation based on connection setting information for specifying at least a communication address of the communication terminal for observation, a communication protocol and object information to transmit a predetermined push request thereto for carrying out setting, here the push request requires the communication terminal for monitor to be accessed so as to make a reply about change in a specified object information as an event response notice when an event occurs in conjunction with the object information.

Also this method is further characterized in that the communication terminal for observation observes object information specified by the push request and accesses the communication terminal for monitor to reply about the change in object information as an event response notice when an event occurs in conjunction with object information.

According to such a method, whenever the event response notice is received at the communication terminal for monitor and decoded, the object symbol or image displayed on the observation monitor screen of the communication terminal for monitor is dynamically changed in accordance with the change in object information.

Moreover according to the present invention, the communication terminal for observation automatically transmits data reflecting change in object information as an event response notice to the communication terminal for monitor based on the push request set in advance by the communication terminal for monitor, whereby object information can be observed while viewing the dynamically updated observation monitor screen.

In addition, according to the present invention, since connection setting information includes communication protocol information, a user can conduct a status observation through an observation monitor screen without recognizing the respective communication protocols even in the case that a status observation is conducted by obtaining information for display from a plurality of communication terminals having different communication protocols.

The communication terminal for observation which may be employed in the present invention includes such a gateway as to be used in a building observation system, an information server for general utilization and the like and, actually, for example, a sensor, a control unit, a file, a data base, peripheral apparatuses or the like such as a printer and the like, under the observation of these communication terminals can be employed as the observation devices for object information.

In addition, in a preferred embodiment of the present invention, communication terminal for monitor comprises as an executable program, a web browser with the function of web browsing display and with an expanded function of dynamically changing an object symbol or image included in an observation display information and a user interface for transmitting to preset a push request and for decoding an event response notice replied from a communication terminal for observation in cooperation with the web browser, whereby the object symbol or image related to the object information specified by the push request and displayed on the monitor screen is dynamically changed by cooperative work with the web browser and the user interface.

In such a configuration, the web browser, which has a web browsing display function, and the user interface for carrying out the transmission and the setting of a push request and for decoding an event response notice transmitted as a reply from the communication terminal unit for observation in a cooperative manner so as to carry out a dynamic displaying, therefore, the used web browser can be utilized as it is and a user-customized observation display system can be realized only by integrating the user interface into a communication terminal connected to the network.

In addition, this user interface operates in the background without operation by the user. Therefore, the user can observe object information by viewing the observation display information including object symbol or image which is dynamically updated on observation monitor screen by only carrying out an operation for calling up the observation display screen after the start up of the web browser.

Moreover, the web browser having a dynamic display function using DHTML can be also utilized, therefore this function can be utilized as it is in such a web browser.

In addition, in a communication terminal for monitor, an object designing tool for selecting and preparing a desired object symbol or image related to object information to be observed may be stored as an executable program tool, by which the desired object symbol or image can be arranged on a predetermined layout editing screen for observation.

In this case, the connection setting information may be registered in advance in a web server on the computer network, and in such case at a communication terminal for monitor, web browser is operated and its connection setting information is retrieved from the web server via a communication network and transferred to a user interface, while at a user interface, push request is transmitted to a communication terminal for monitor based on the connection setting information.

In addition, an observation display system being proposed at the same time has the following configuration.

That is to say, this system comprises a communication terminal for monitor and a communication terminal for observation, both of which are provided on a computer network.

And in this system, the communication terminal for monitor comprises: an observation monitor screen on which observation display information including an object symbol or image prepared in advance corresponding to object information to be observed; a function of transmitting to preset a predetermined push request based on a connection setting information at least specifying a communication address of the communication terminal for observation, a communication protocol and the object information to be observed, in which the push request requires the communication terminal for observation to access the communication terminal for monitor and to send thereto a reply about a change in the object information specified by the push request as an event response.

While also in this system, the communication terminal for observation comprises a function of determining whether or not the event has occurred in conjunction with the object information specified by the push request and further a function of accessing the communication terminal for monitor and replying change in the object information specified by the push request as an event response notice, when an event occurs in conjunction with the object information specified by the push request and the object information is changed thereby.

In a preferred embodiment of the observation display method, in the communication terminal of the monitor, an object designing tool for selecting and preparing a desired object symbol or image related to the object information to be observed may be stored as an executable program, by which desired object symbol or image is prepared and arranged in a predetermined layout on observation monitor screen for generating and editing an observation display screen.

Desirable observation display screen can be designed using such object designing tool, therefore, observation display screen information can be customized without preparing or coding connection setting information or observation setting information.

In addition, as a communication terminal for observation, such gateway as to have a function of constantly observing a plurality of control points can be used, which may be logged in by inputting a specific identification code from a computer network.

Also in such a system, the designing tool may be downloaded from the communication terminal for observation by inputting an identification code, therefore, a firewall can be also formed against invasion from outside so that security is maintained in the closed network system.

Moreover, in this case, the object designing tool may be stored in advance within the communication terminal for observation so as to make it downloadable by inputting a specific identification code from the communication terminal for monitor.

In addition, the connection setting information may be registered in a web server on the computer network, in such a case, the communication terminal for monitor operates the web browser, so that the connection setting information is retrieved from the web server via the network and transfers to the user interface, while the user interface transmits a push request to the communication terminal for observation based on the connection setting information.

In case that the present invention is carried out, a program usually may have been installed in a computer.

This program comprises a program executed within a communication terminal for and a program executed within a communication terminal for observation.

Here, the program executed within a communication terminal for monitor comprises a program step of preparing in advance object symbol or image to be displayed on a observation monitor screen which is related to object information to be observed, a program step of accessing a communication terminal for observation to preset push request thereto based on connection setting information which specifies at least a communication address of the communication terminal for observation, a communication protocol and said object information to be observed, said push request requiring to be accessed said communication terminal for monitor and to transmit thereto a reply about a change in said object information specified by the push request as an event response, a program step of decoding said event response notice every when said event response notice is received from said communication terminal for observation, and a program step of dynamically changing said object symbol or image depending on said event response notice.

While the program executed within a communication terminal for observation comprises a program step of observing said information object to be observed, specified by said push request, and a program of accessing said communication terminal for monitor to transmit said event response notice when an event information occurs in conjunction with said object information.

Further such program can be also executed using expanded web browser, wherein said program is incorporated into said communication terminal for monitor as a user interface and is executed in cooperation with web browser with expanded function of dynamically changing said object symbol or image displayed on said observation monitor screen and with function of browsing display, and wherein said program comprises at least the step of dynamically changing an object symbol or image related to said object information to be observed in response to said event response notice.

Moreover, in such a configuration if the connection setting information and the observation setting information are registered in a wave server provide on the network, the observation display information to be displayed on the observation monitor screen can be downloaded from the communication terminal for monitor and, at the same time, other information related to observation can be also downloaded.

Accordingly, the user may register in such web server, in advance, the connection setting information and the observation setting information corresponding to the observation display screen, together with the designed screen.

Such program may be integrated into the communication terminal for monitor so as to operate in conjunction with a web browser which is provided with an expanded function of dynamically changing the object symbol or image displayed on the observation monitor screen in addition to the conventional display function of web browsing.

Such program above mentioned using for executing the present method and system may be stored in advance in FTP server and other various server available on web and which may be used by accessing to such servers and down loading therefrom when desired, however it may be also stored in record media such as FD or CD Rom or the like for convenience in storing and transportation in the form separating from the computer network and used by being installed in the communication terminal for monitor or the communication terminal for observation when necessary.

In this case such program may be stored in the record media in such signal form that the computer in which the program is to be installed is readable and executable.

Such program may be operated for executing the present invention by it self or in cooperation with OS program or other various application programs which may be installed in a communication terminal unit in which the program is to be installed.

A program record media with following function and feature is also disclosed in the present specification in wherein the program record media characterized in that the program executable in a communication terminal for monitor includes sequential steps for following functioning: preparing in advance object symbol or image to be displayed on a observation monitor screen which is related to object information to be observed, accessing a communication terminal for observation to preset push request thereto based on connection setting information which specifies at least a communication address of the communication terminal for observation, a communication protocol and said object information to be observed, said push request requiring to be accessed said communication terminal for monitor and to transmit thereto a reply about a change in said object information specified by the push request as an event response, decoding said event response notice every when said event response notice is received from said communication terminal for observation, dynamically changing said object symbol or image depending on said event response notice, and in that the program executable in a communication terminal for observation includes sequential steps for following functioning: observing said information object to be observed, specified by said push request, accessing said communication terminal for monitor to transmit said event response notice when an even occurs in conjunction with said object information.

Such program record media may be applied to such a user interface which is used and incorporated into a web browser which is widely used in communication terminals connected to a computer network.

The program record media used in such case is characterized by storing a series program in the form of computer readable signals, which functions as user interface that is incorporated into expended web browser with function of dynamically changing an object symbol or image related to object information to be observed, in addition to function of web browsing display, and is operated in cooperation with the expanded web browser, the program is installed into and operated in the communication terminal for monitor and/or the communication terminal for observation so as to dynamically change an object symbol or image related to information object to be observed in response to changing in the information object.

DETAILED DESCRIPTION OF THE PREFERRED EMBODIMENTS

Embodiments of the present invention will be described below with reference to the drawings.

Figure 1:
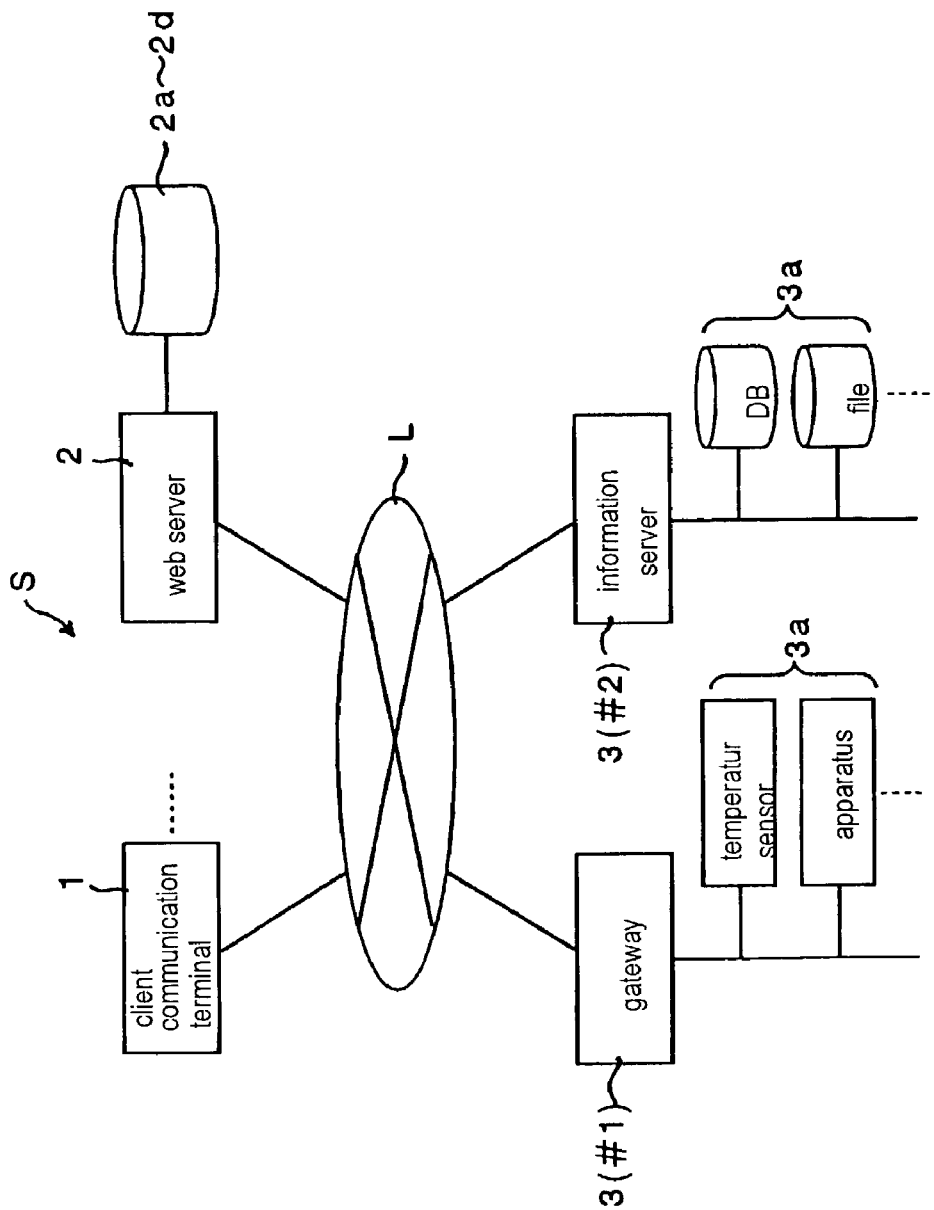
FIG. 1 is a system diagram showing one embodiment of the system construction of the present invention.

FIG. 1 is a system diagram showing one embodiment of the system construction of the present invention.

In this system S a communication terminal for monitor such as a client terminal, a web server 2 storing web page contents data 2*a*–2*d* for displaying on the client terminal 1 and plural communication terminals 3 for observation such as gateway, server are connected each other by way of interactive communication via a communication network L such as the Internet. The web page contents data 2*a*–2*d* may be set up in the client terminal 1 in advance. Namely, the system may be constructed without a web server 2.

This system S is constructed such that the client terminal 1 can observe objective devices as observation object such as a temperature sensor 3*a* and an information server 3(#2) connected to the gateway 3(#1) and a data base 3*b* on a specific monitor screen by operating a web browsing program such as web browsers. A control device, a disc device, a printer device, a file and the like may be used as other objective device.

For example, the access number of the disc device and updating of the specific item of the file may be used as an observation object.

The client terminal 1 is constructed so as to be interactively communicated with the communication terminals for observation 3 via the Internet L, wherein the terminal 1 is connected to each communication terminal 3 with a different communication protocol. Here, the terminal 1 communicates with the gateway 3(#1) by way of so called well known EMIT protocol and with the information server 3(#2) by way of so called well known SOAP protocol.

Figure 2:
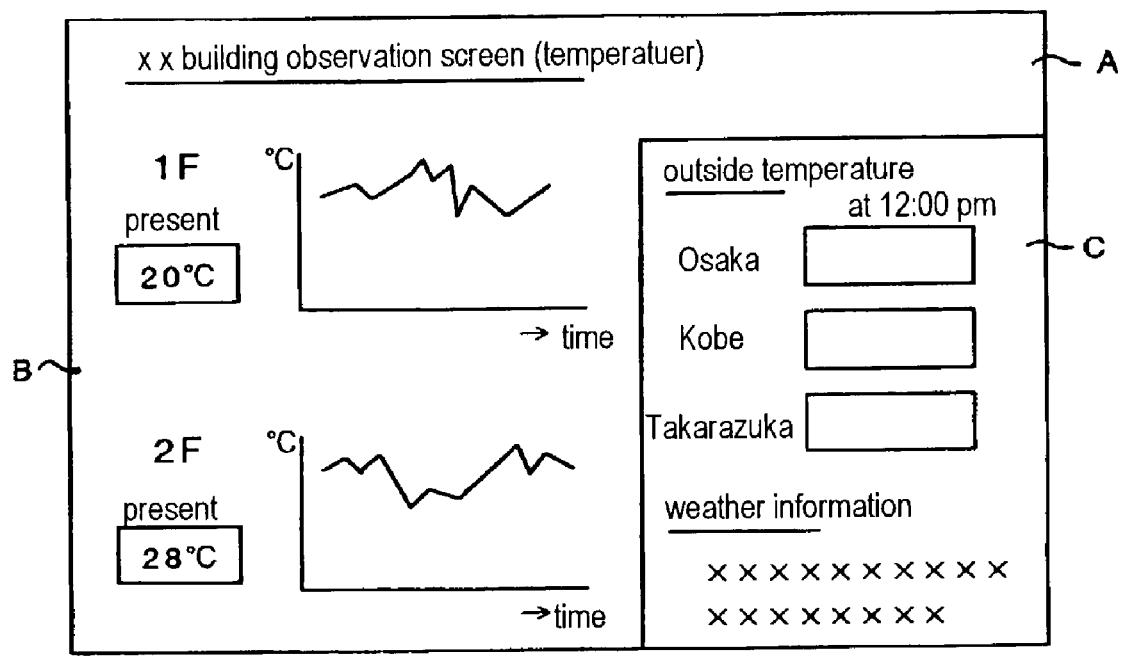
FIG. 2 shows a display sample of an observation monitor display displayed by the communication terminal for monitor.

For example in a building monitoring screen A as shown in FIG. 2, a temperature information in the building is displayed in a building observation window B, while a temperature information out of the building is displayed in a weather window C. Data of a temperature sensor 3a connected to the gateway 3(#1) are shown on the window B and data of a weather data base 3b contained in a weather information server 3(#2) are shown on the window C as an object symbol for observation which is composed of such as texts, images, graphics and tables, through which the temperature in the building can be observed.

The present invention is characterized in that a plurality sorts of observation information including various object images related to observation objects on the observation monitor screen A can be automatically updated at a timing of changing conditions or at a fixed cycle without especial operation for observation of the client terminal 1.

In case of display updating, only the object symbol or image related to object information may be updated or the entire information displayed on the observation monitor screen may be updated.

According to such a system, the observation monitor screen is updated every when object information is changed so that a supervisor observing the building can see a current information without especial operating for observation of the client terminal 1.

Figure 3:
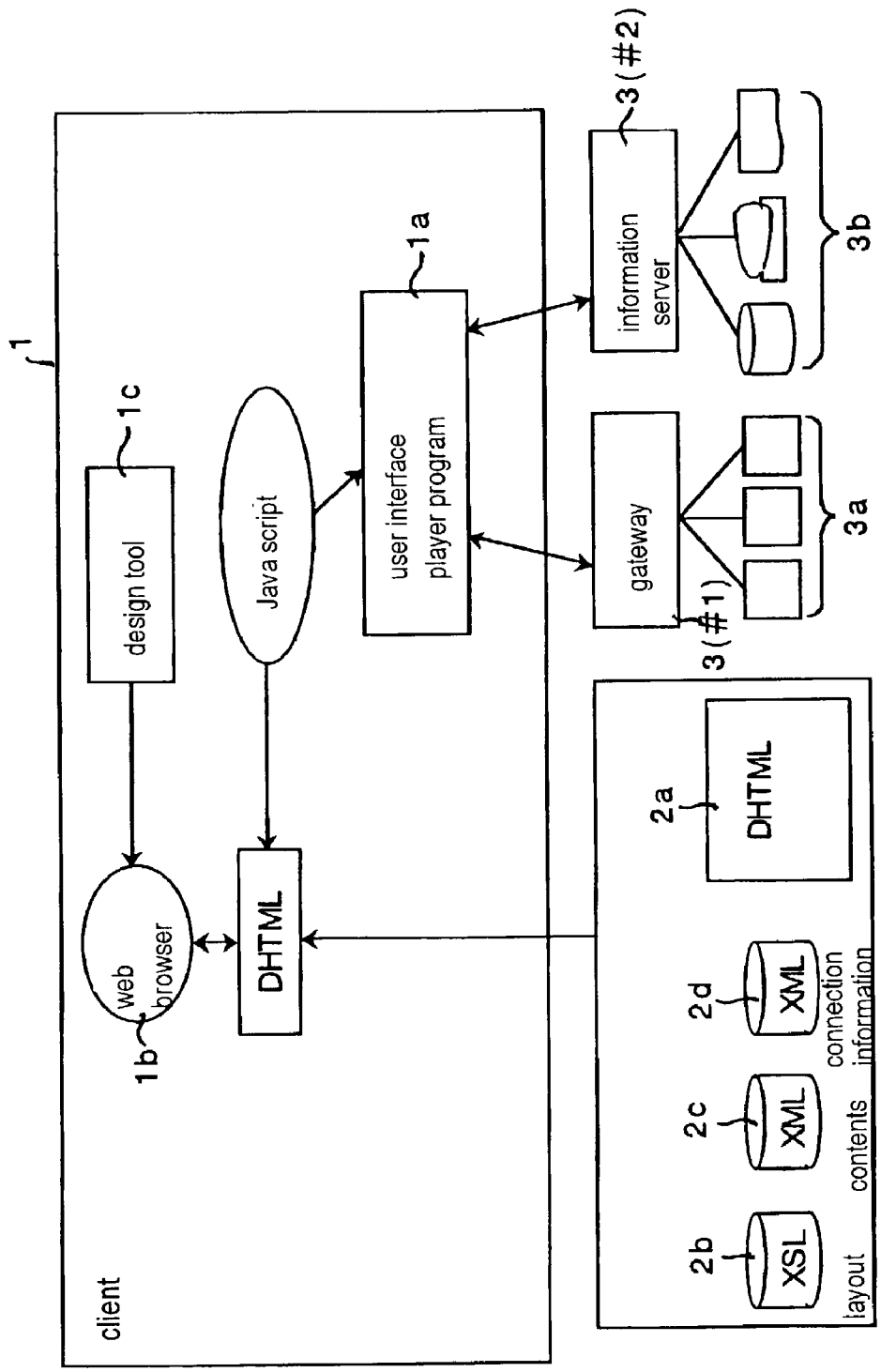
FIG. 3 is a software relation view showing detailed software construction of the present invention.

FIG. 3 is a software relation view showing detailed software construction of the present invention.

The client terminal 1 comprises a web browser 1b with the function of web browsing display, a user interface program 1a which communicates with the communication terminals 3 for observation in cooperation with the web browser 1b in order to automatically update observation monitor screen and a designing tool 1c for observation display information, which will be explained later.

This user interface 1a has following main functions; (1) generating a push request for executing an event registration for the communication terminals 3 for observation, (2) receiving an event response notice sent from the communication terminals 3 for observation and editing and transferring the data to the web browser 1b. Here the event means all information that cause the observation object some change, accordingly such event includes phenomena of timing of condition changing noticed from a gateway or an information server 3(#2) and a fixed cycle timing generated from a clock timer or the like.

Next, the observation monitor screen will be explained.

Calling up and selecting the observation monitor screen A by operating the web browser 1b at the client terminal 1, the web browser 1b downloads and executes the screen display program 2a for the observation monitor screen A, for example such program that is described with a page description language HTML, and a file group of 2b–2d, of which observation setting or connection setting information for displaying variable data on the observation monitor screen is defined by XML or XSL.

Simultaneously, at the client terminal 1, the user interface 1a is operated to generate a push request based on the connection setting information and transmit the push request to the gateway 3(#1) and the information server 3(#2) for setting, namely for registration.

In reply to this, gateway 3(#1) and the information server 3(#2) constantly observe objective devices 3a and 3b which are specified by the push request as object information, after initially receiving the data about objective device 3a, 3b specified by the push request, and they access the client terminal 1 and transmit event response notice in which change data of the device 3a, 3b is included when an event such as condition change or the like occurs in conjunction with these objective device 3a or 3b.

And when the client terminal 1 receives the event response notice the above mentioned, the client terminal 1 decodes the notice on whether such change occurs in conjunction with which observation object and how object symbol or image related to object information is displayed on the observation monitor screen, based on the file group 2b–2d downloaded in advance, and thereafter such event is informed to the web browser 1a within the client terminal 1 and transfers the change data included in the event response notice to web browser 1a. As the result, the web browser 1a updates the observation display information, thereby changing the object image related to object information in response to such change.

The web browser 1b here applies a dynamic HTML (DHTML), which is an expanded function of the HTML, for dynamically changing the object image related to the observation object. Such DHTML achieves dynamic display by incorporating a script into the program described in DHTML while accessing the files 2b and 2c thus defined by XML and XSL.

The user interface 1a edits the change data based on these defined files 2b and 2c for updating the display based on the change data and transfers the data in order for the script to read the edit data.

Thus, the user interface 1a plays a part of intermediacy for transferring information between the web browser 1b and the communication terminal 3 for observation. Further, since the interface 1a is automatically operated in background in parallel with the display process of the web browser 1b, users may not be required to give commands by a specific operation to the user interface 1a.

Figure 4:
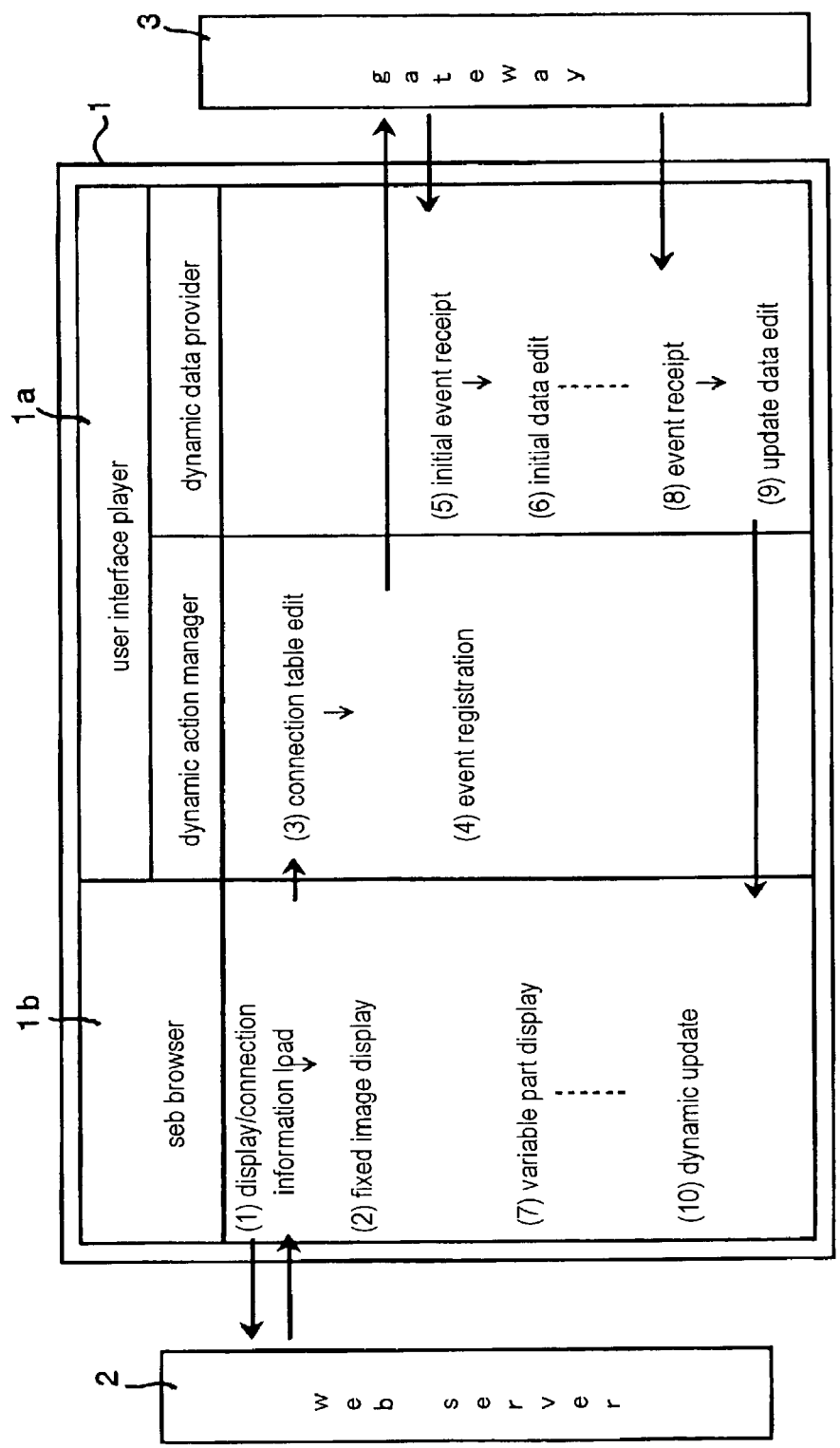
FIG. 4 shows a flow chart showing one embodiment of a basic process according to the present invention.

FIG. 4 shows a flow chart (1)–(10) of the process executed by each program, when the display is automatically updated.

As shown in it, the user interface 1a has such role that it enables a dynamic action manager to execute an event registration to the gateway 3 and that it enables a dynamic data provider to receive the event response notice from the gateway 3 and to transfer the change data in object information to the web browser 1b.

Figure 5:
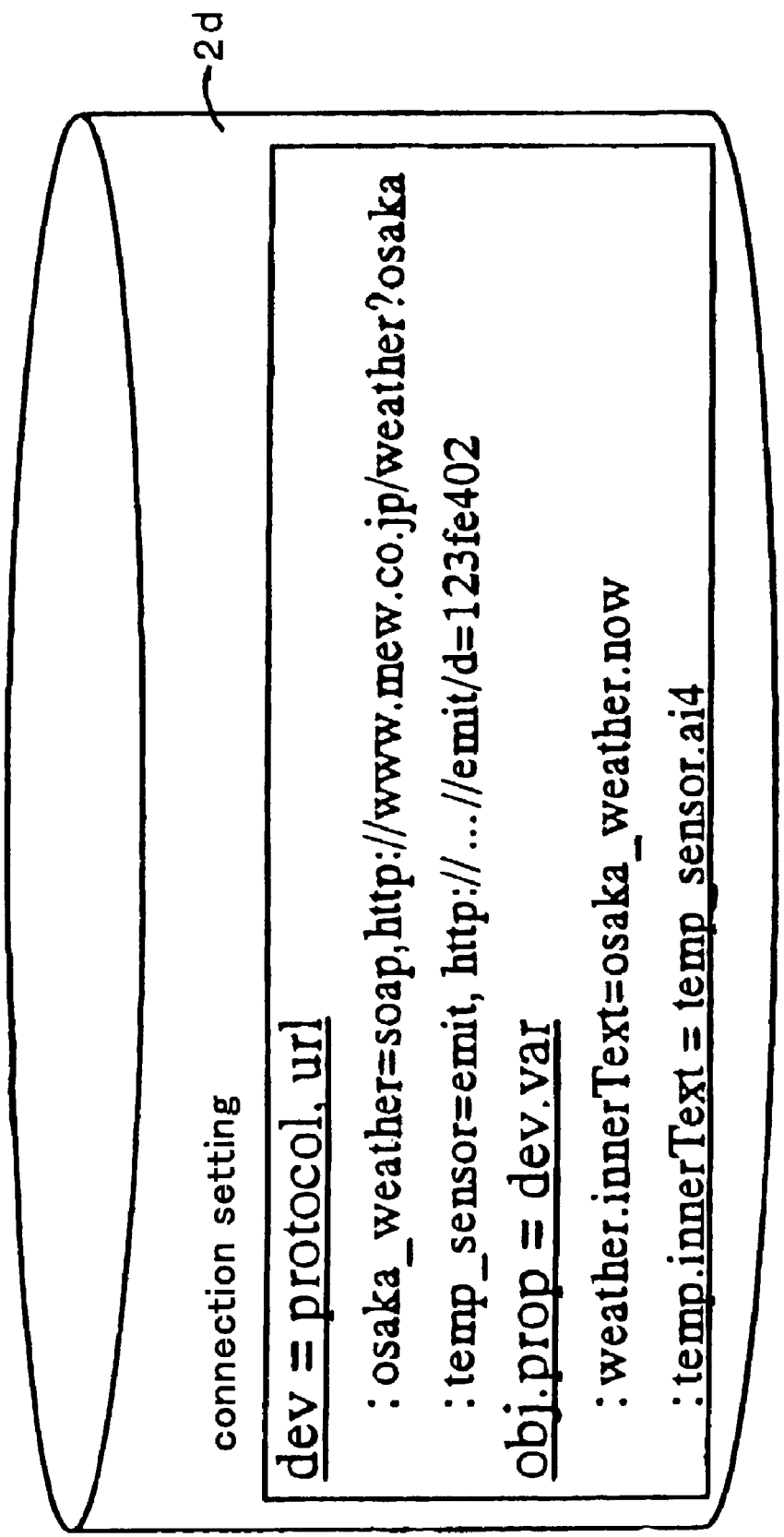
FIG. 5 shows one embodiment of a defined data of the connection setting information.

FIG. 5 shows one embodiment of a defined data of the connection information file 2d for connection setting information which is downloaded from a web server 2.

In this embodiment, the connection setting information includes information defining the communication protocol and the communication address (URL) of the communication terminal 3 for observation (#1, #2) and information for specifying an objective device, i.e. an observation object.

Here, the connection setting information is described in a specific language, which may be a language using such grammar as to be deciphered by both a communication terminal 1 for monitor and a communication terminal 3 for observation each other.

Accordingly, as understood from the above, a dynamic updating display can be easily achieved if the information for connection is defined in advance, even in case that various object symbols or images displayed on the observation monitor screen are associated with plural communication terminals 3 (#1, #2) different in communication protocols respectively.

Next, an object designing tool will be explained.

Figure 6:
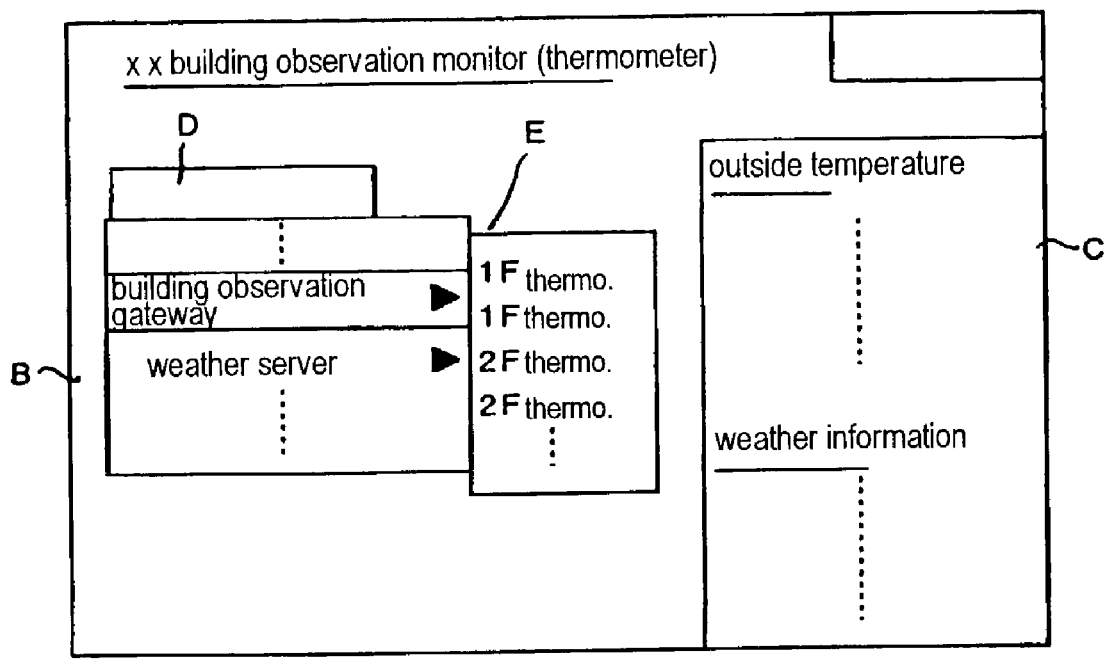
FIG. 6 shows a design sample of an observation monitor screen by the object designing tool.

FIG. 6 shows a design sample of the observation monitor screen by an object designing tool for designing an observation display information.

This designing tool is a dedicated program tool prepared for designing observation monitor screen for a specific gateway and the like is used by downloading from the corresponding gateway.

At the communication terminal 1 for monitor, display design is performed by activating the designing tool after down loading it from the corresponding gateway by inputting an identification code thereinto, then by operating with mouse or the like designing parts registered in advance in the designing tool.

After doing a layout of the building monitor window B and the weather window C, each attribute of object symbol affixed on the windows is set.

For example, when the object symbol D on the window B is clicked as shown in the FIG. 6, all the objective devices under observation by the gateway are shown in a pull-down menu E, next when any one of the devices is selected, association with object information and the objective device can be completed. Accordingly using such designing tool, when selecting specified objective device, designing tool generates connection setting information and/or observation setting information.

Such screen display program including the connection setting information and the observation setting information with respect to designed monitor screen may be stored in the communication terminal 1 for monitor as it is or may be stored in the web server 2 so as to enable to be downloaded and operated when demanded.

By the above-mentioned design operation, the layout of the observation monitor screen is made and further the connection setting information and the observation setting information required for a dynamic updating display are automatically produced, thereby saving the time for development by a soft ware designer. Moreover, an observer can make an original favorite observation monitor screen by designing it according to his taste.

When the observation monitor screen designed by next operating of the web browser is called up, a dynamic updating display can be achieved by cooperative work with the user interface and the web browser.

What is claimed is:

1. An observation display method for dynamically changing on an observation monitor screen an object symbol or image related to object information to be observed on a computer network, comprising the steps of:

at a communication terminal for monitoring on the computer network, providing an observation monitor screen;

preparing observation display information to be displayed on the observation monitor screen in which said object symbol or image related to object information to be observed is included; and accessing a communication terminals for observation each of which communicates using its own protocol via the computer network to transmit and preset a predetermined push request thereto, based on connection setting information in which a communication address of the communication terminal for observation, a communication protocol and object information to be observed are at least specified per communication terminal for observation, the push request registering a predetermined event on the object information and requiring thereto a reply of an event response notice, wherein:

at each of the communication terminals for observation accessing the communication terminal for monitor and replying thereto the object information specified by the push request as the event response notice, when the predetermined event occurs; and at the communication terminal for monitor, further decoding the event response whenever the event response notice is received from any of the communication terminals for observation, so that the object symbol or image is dynamically changed depending on the change in the object information related to the symbol or the image received from said any of the communication terminals for observation.

2. The observation display method according to claim 1, wherein:

the communication terminal for monitor stores, as an executable program, a web browser with the function of web browsing display and with an expanded function of dynamically changing the object symbol or image included in the observation display information and a user interface for transmitting to preset the push request and for decoding the event response notice replied from the communication terminal for observation in cooperation with the web browser; and the object symbol or image related to the object information specified by the push request and displayed on the observation monitor screen is dynamically changed by cooperative work with the web browser and the user interface.

3. The observation display method according to claim 1, wherein:

the communication terminal for monitor stores, as an executable program tool, an object symbol or image designing tool for selecting, preparing and arranging a desired object symbol or image for the object information to be observed, to generate and edit the observation display information on a predetermined layout editing screen.

4. The observation display method according to claim 1, wherein:

the connection setting information is registered in advance in a web server on the computer network; and the communication terminal for monitor retrieves the connection setting information from the web server via the network and transfers it to the user interface and in reply to this, the user interface transmits to preset the push request to the communication terminal for observation based on the communication setting information.

5. An observation display system using a computer network in which a communication terminal for monitor and a communication terminal for observation are provided, wherein said communication terminal for monitor comprises:

an observation monitor screen on which observation display information including an object symbol or image related to object information to be observed is displayed; and a function of accessing communication terminals for observation each of which communicate using its own protocol via the computer network to transmit and preset a predetermined push request thereto based on a connection setting information in which a communication address of the communication terminal for observation, a communication protocol and said object information to be observed are at least specified per communication terminal for observation, the push request registering a predetermined event on said object information and requiring thereto a reply of an event response notice, wherein:

each of the communication terminals for observation comprises a function of determining whether or not said predetermined event occurs, and further a function of accessing said communication terminal for monitor and replying thereto said object information specified by said push request as the event response notice when said predetermined event occurs, whereby, at said communication terminal for monitor, said event response notice is decoded whenever said event response is received from any of the communication terminals for observation, so that said object symbol or image is dynamically changed depending on the change in said object information related to said symbol or said image received from said any of the communication terminals for observation.

6. The observation display system according to claim 5, wherein:

said communication terminal for monitor comprises as an executable program, a web browser with the function of web browsing display and with an expanded function of dynamically changing said object symbol or image included in said observation display information, and a user interface for transmitting to preset said push request and for decoding an event response notice replied from said communication terminal for observation in cooperation with said web browser, whereby said object symbol or image related to said object information specified by said push request and displayed on said monitor screen is dynamically changed depending on said event response notice from said communication terminal for observation by cooperative work with said web browser and said user interface.

7. The observation display system according to claim 5, wherein:

said communication terminal for monitor comprises as an executable program, an object symbol or image designing tool, by which a desired object symbol or image for said object information to be observed is selected or generated as well as other parts so as to produce said observation display information on a predetermined layout editing screen.

8. The observation display system according to claim 5, wherein:

said communication terminal for observation observes plural control points as object information to be observed; and said communication terminal for monitor is such a gateway device as to enable to be logged in when a specified identification code is inputted thereto via the computer network.

9. The observation display system according to claim 5, wherein:

said object designing tool is stored in advance in said communication terminal for observation; and said tool is enable to be down loaded when a specified identification code is inputted from said communication terminal for monitor.

10. The observation display system according to claim 5, wherein:

said connection setting information is registered in advance in a web server on said computer network; and said communication terminal for monitor retrieves said connection setting information from said web server via said network and transfers it to said user interface, in reply to this said user interface transmits to preset said push request to said communication terminal for observation.

11. A program for executing observation display stored in a memory of a communication terminal provided on a computer network in the form of a computer readable signal, wherein a program executed within an observation monitor screens, comprises:

a program step of preparing observation display information to be displayed on the observation monitor screen in which said object symbol or image related to object information to be observed is included;

a program step of accessing a communication terminals for observation each of which communicate using its own protocol via the computer network to transmit and preset a predetermined push request thereto based on connection setting information in which a communication address of the communication terminal for observation, a communication protocol and said object information to be observed are at least specified per communication terminal for observation, the push request registering a predetermined event on said object information the and requiring thereto a reply of an event response notice;

a program step of decoding the event response whenever said event responses notice is received from any of said communication terminals for observation; and a program step of dynamically changing said object symbol or image depending on the change in said object information related to the symbol or the image received from said any of the communication terminals for observation, wherein:

a program executed within each of the said communication terminals for observation comprises: a program step of determining whether or not said predetermined event occurs; and, and a program of accessing said communication terminal for monitor and replying thereto, said object information specified by said push request as said event response notice when said predetermined registered event occurs.

12. The program according to claim 11, wherein:

said program is incorporated into said communication terminal for monitor as a user interface and is executed in cooperation with web browser with expanded function of dynamically changing said object symbol or image displayed on said observation monitor screen and with function of browsing display; and said program comprises at least the step of dynamically changing an object symbol or image related to said object information to be observed in response to said event response notice.

13. The observation display system according to claim 6, wherein:

said communication terminal for monitor observes plural control points as object information to be observed; and said communication terminal for monitor in such gateway device as to enable to be logged in when a specified identification code is inputted thereto via a computer network.

14. The observation display system according to claim 6, wherein:

said object designing tool is in advance stored in said communication terminal for observation; and said tool is enable to be down loaded when a specified identification code is inputted from said communication terminal for monitor.

* * * * *

UNITED STATES PATENT AND TRADEMARK OFFICE
CERTIFICATE OF CORRECTION

PATENT NO. : 7,225,252 B2  Page 1 of 1
APPLICATION NO. : 10/188332
DATED : May 29, 2007
INVENTOR(S) : Laurent Safa It is certified that error appears in the above-identified patent and that said Letters Patent is hereby corrected as shown below:

In the claims:

in claim 11, column 12, line 22, the word "screens" is incorrect and should be changed to read as: --screen--;

in claim 11, column 12, line 37, the word "the" should be deleted; and in claim 11, column 12, line 50, the second occurrence of the word "and" should be deleted.

Signed and Sealed this

Sixteenth Day of October, 2007

JON W. DUDAS
*Director of the United States Patent and Trademark Office*